United States Patent
Dick

(10) Patent No.: US 9,126,506 B2
(45) Date of Patent: Sep. 8, 2015

(54) LONGITUDINALLY ADJUSTABLE VEHICLE SEAT

(75) Inventor: Ingo Dick, Niederstaufenbach (DE)

(73) Assignee: KEIPER GmbH & Co. KG., Kaiserslautern (DE)

( * ) Notice: Subject to any disclaimer, the term of this patent is extended or adjusted under 35 U.S.C. 154(b) by 0 days.

(21) Appl. No.: 14/350,940

(22) PCT Filed: Aug. 23, 2012

(86) PCT No.: PCT/EP2012/066439
§ 371 (c)(1),
(2), (4) Date: Apr. 10, 2014

(87) PCT Pub. No.: WO2013/053526
PCT Pub. Date: Apr. 18, 2013

(65) Prior Publication Data
US 2014/0263921 A1    Sep. 18, 2014

(30) Foreign Application Priority Data

Oct. 12, 2011 (DE) .......................... 10 2011 115 948

(51) Int. Cl.
*B60N 2/07* (2006.01)
*B60N 2/12* (2006.01)

(52) U.S. Cl.
CPC ............ *B60N 2/0722* (2013.01); *B60N 2/0705* (2013.01); *B60N 2/0727* (2013.01); *B60N 2/12* (2013.01)

(58) Field of Classification Search
CPC .. B60N 2/0715; B60N 2/0843; B60N 2/0732; B60N 2/086; B60N 2/073; B60N 2/062; B60N 2/0727; B60N 2/43

USPC .................. 248/424, 429, 430; 297/344.1
See application file for complete search history.

(56) References Cited

U.S. PATENT DOCUMENTS

| | | | |
|---|---|---|---|
| 2008/0231101 A1* | 9/2008 | Sakakibara et al. | 297/344.1 |
| 2011/0012005 A1 | 1/2011 | Jaehner et al. | |
| 2011/0121154 A1* | 5/2011 | Kimura et al. | 248/429 |
| 2011/0163217 A1* | 7/2011 | Kimura et al. | 248/429 |
| 2012/0006963 A1* | 1/2012 | Yoshida et al. | 248/429 |
| 2012/0205512 A1* | 8/2012 | Fujishiro et al. | 248/429 |
| 2013/0119222 A1* | 5/2013 | Hayashi | 248/429 |
| 2013/0193730 A1* | 8/2013 | Walter et al. | 297/341 |

FOREIGN PATENT DOCUMENTS

| | | |
|---|---|---|
| DE | 100 39 510 A1 | 2/2002 |
| DE | 203 08 465 U1 | 8/2003 |
| DE | 100 39 510 B4 | 7/2004 |
| DE | 698 32 435 T2 | 8/2006 |

(Continued)

*Primary Examiner* — Steven Marsh
(74) *Attorney, Agent, or Firm* — McGlew and Tuttle, P.C.

(57) ABSTRACT

A longitudinally adjustable vehicle seat, having at least one pair of seat rails (10), has a first seat rail (12) fixed to the structure, a second seat rail (13) guided in the first seat rail (12) and connected to the vehicle seat (1). Balls (14) are arranged in ball holders (15), which are arranged between the first seat rail (12) and the second seat rail (13) in order to reduce friction. The first seat rail (12) forms a ball track along which the balls (14) roll with a first end stop and a second end stop, which limit the mobility of the pair of seat rails (10). At least one elevation (12″) is provided, which projects into the ball track. The elevation (12″) can be overcome by at least one ball (14) and the ball holder (15).

10 Claims, 4 Drawing Sheets

(56) References Cited

FOREIGN PATENT DOCUMENTS

| | | |
|---|---|---|
| DE | 10 2006 032 328 A1 | 2/2007 |
| DE | 10 2008 056 969 B3 | 10/2009 |
| DE | 10 2008 056 683 A1 | 5/2010 |
| EP | 1 389 557 B1 | 12/2005 |
| JP | S58 47249 U | 3/1983 |
| JP | S60 115732 U | 8/1985 |
| JP | S61 139642 U | 8/1986 |
| JP | S64 43730 U | 3/1989 |
| JP | 2007 308117 A | 11/2007 |
| JP | 2008 179265 A | 8/2008 |

* cited by examiner

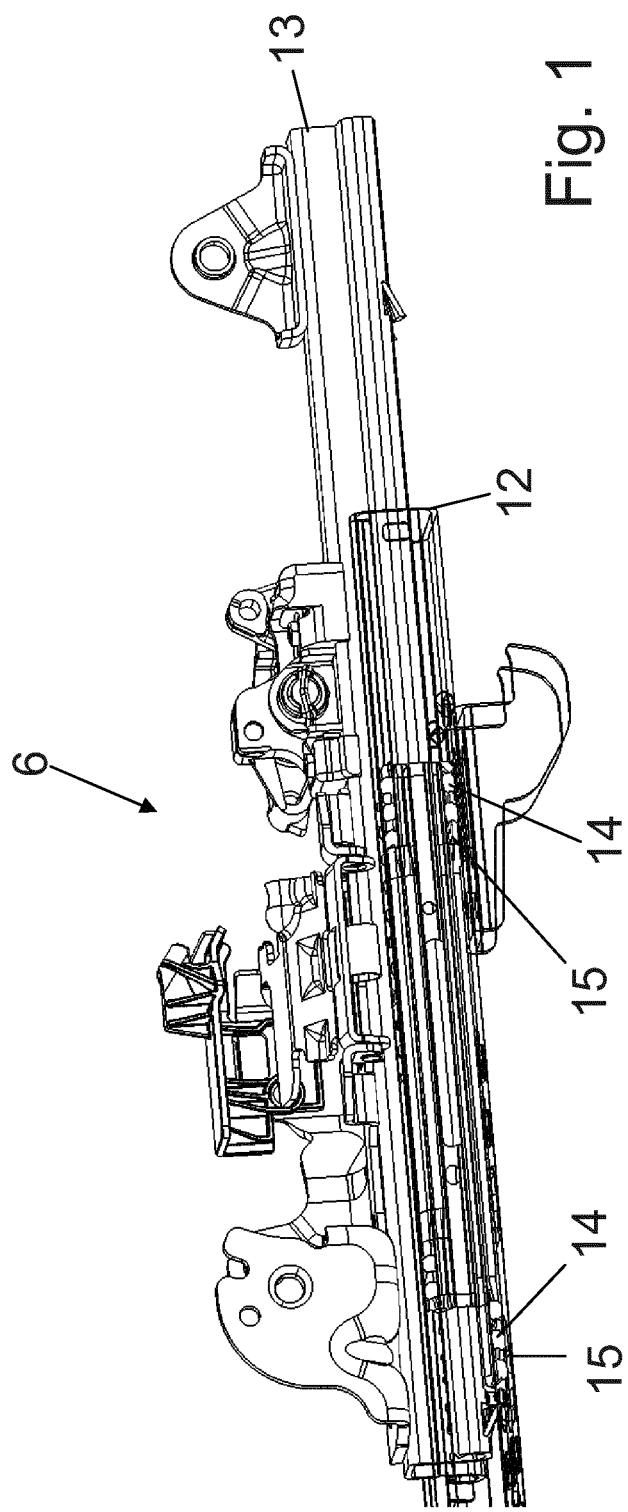

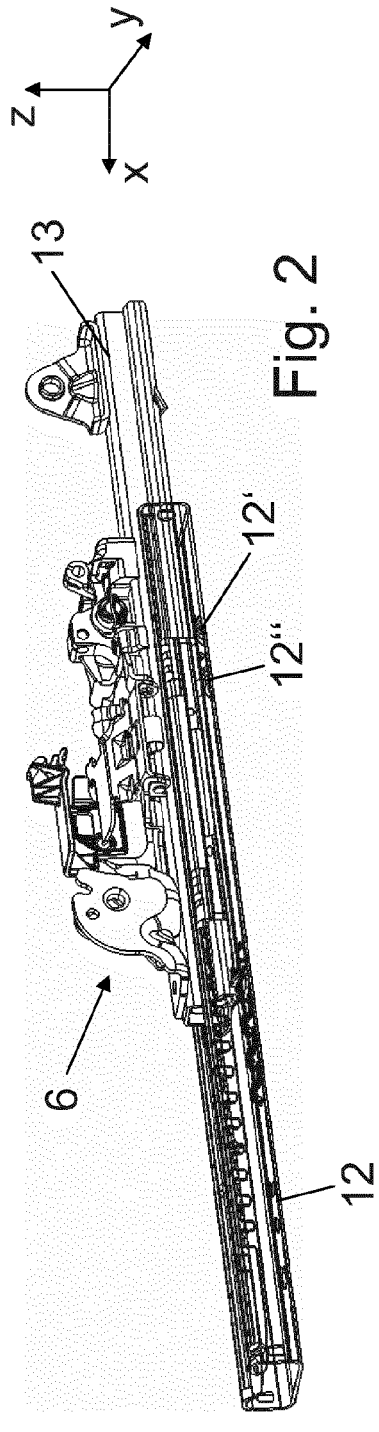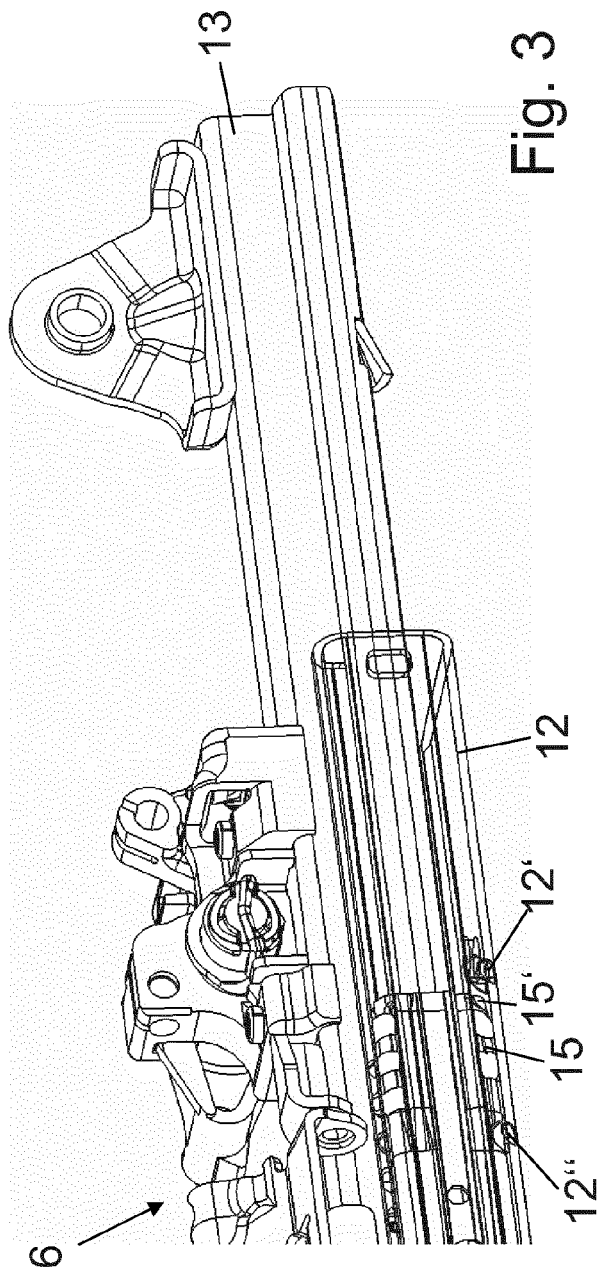

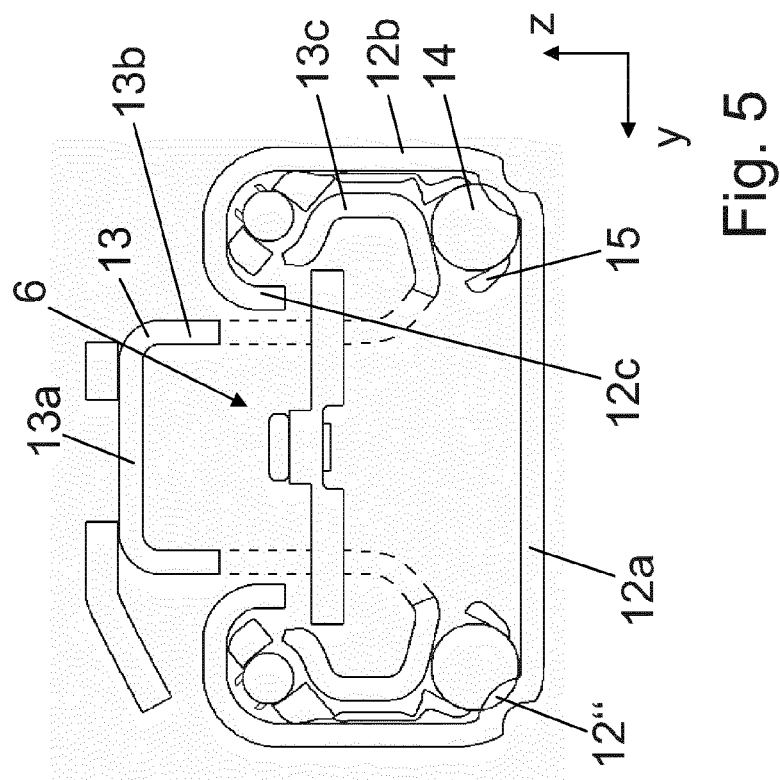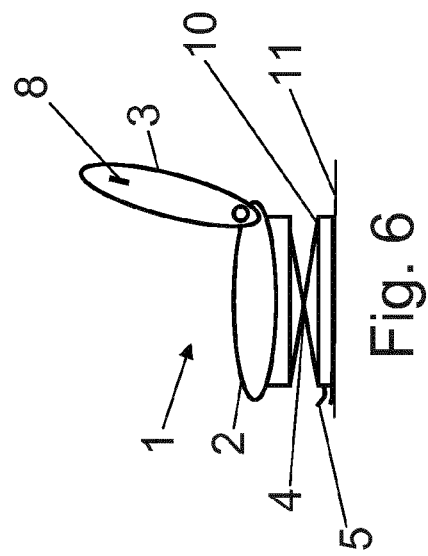

LONGITUDINALLY ADJUSTABLE VEHICLE SEAT

CROSS REFERENCE TO RELATED APPLICATIONS

This application is a United States National Phase Application of International Application PCT/EP2012/066439 filed Aug. 23, 2012 and claims the benefit of priority under 35 U.S.C. §119 of German Patent Application DE 10 2011 115 948.0 filed Oct. 12, 2011, the entire contents of which are incorporated herein by reference.

FIELD OF THE INVENTION

The invention relates to a longitudinally adjustable vehicle seat having at least one seat rail pair connected to the vehicle seat, balls between the seat rails to reduce the friction and stops that delimit the movability of the seat rail pair.

BACKGROUND OF THE INVENTION

DE 100 39 510 B4 has disclosed a seat rail pair for a longitudinally adjustable vehicle seat, having a lower rail and an upper rail which is guided such that it can be displaced relative to the lower rail in the seat rail longitudinal direction, which rails engage behind one another with their profiles, having balls which are arranged in an interaction region between the lower rail and the upper rail, and a locking apparatus for locking the lower rail and upper rail. Here, the profile of the lower rail and the upper rail is symmetrical in the interaction region with respect to a plane which is defined by the seat rail longitudinal direction and the vertical. The balls are in contact with ball raceways which are formed in each case in an inclination region of the upper rail and are inclined with respect to the horizontal at an angle of identical magnitude.

DE 10 2006 032 328 A1 describes a vehicle seat which comprises a seat which is mounted slidingly on a sliding rail in a longitudinal direction between a front and a rear position, the seat having reaching-in portions, in order to keep the sliding rail unlocked after an unlocking operation of a user, and devices for holding back the seat face of the seat if the seat face is situated in the/a front position, as long as the seat face does not experience a rearwardly directed force which is greater than a predefined value.

DE 203 08 465 U1 has disclosed a seat rail for a vehicle seat, in particular for a motor vehicle seat, which seat rail is configured as part of a longitudinal adjuster and has an end stop for a second seat rail in the region of the rear end, a bead being provided between the end stop and the rear end in the wall of the seat rail.

Furthermore, DE 10 2008 056 969 B3 has disclosed a longitudinal adjuster for a vehicle seat. Here, in a seat rail pair for a longitudinally adjustable vehicle seat having a first seat rail which is fixed to the structure, a second seat rail which is guided in said first seat rail and is connected to the vehicle seat, a first end stop, a second end stop, and a releasable locking apparatus for releasably locking the position of the first seat rail with respect to the second seat rail, a first stop face which interacts with the first end stop and a second stop face which interacts with the second end stop define a displacement travel of the second seat rail relative to the first seat rail. Furthermore, a third end stop which can be actuated via an actuating apparatus is provided, which third end stop defines a third end position in interaction with the first stop face, and said third end position of the second seat rail relative to the first seat rail is arranged between said first end position and said second end position. Said third, disconnectable end stop is preferably the rear end stop for normal use, with the result that the displacement travel can be increased to the rear if required. In addition, FIG. 19 of said document shows an end stop which is formed by in each case two parallel notches and a pressed-in portion of the intermediate region which interacts with a ball holder.

SUMMARY OF THE INVENTION

The invention is based on an object of improving a longitudinally adjustable vehicle seat of the type stated at the outset. In particular, the comfort is to be increased.

According to the invention, a longitudinally adjustable vehicle seat is provided having at least one seat rail pair having a first seat rail which is fixed to a vehicle structure, and a second seat rail which is guided in the first seat rail and is connected to the vehicle seat. A ball holder is provided with balls arranged in the ball hold and arranged between the first seat rail and the second seat rail, in order to reduce friction. The first seat rail forms a ball raceway, along which the balls roll. A first end stop and a second end stop delimit the movability of the seat rail pair. At least one elevation protrudes into the ball raceway. The elevation may be overcome by at least one ball and the ball holder.

According to the invention, at least one elevation, in particular preferably produced by way of a pressed-in portion from the outside, is provided in at least one of the seat rails, which elevation protrudes in an arched manner into the ball raceway which is formed on the inside, it being possible for the elevation to be overcome by the ball or the balls and the ball holder.

The provision of an elevation which is produced by means of chipless machining makes rapid, simple production of said elevation possible, the pressing in from the outside taking place under plastic deformation of the seat rail, with the result that said region of the seat rail is readily accessible, in particular if the elevation is provided in the rounded corner region of the seat rail. Furthermore, it is advantageous that, in the case of a seat rail which is produced by means of forming, the (repeated) plastic deformation takes place in a region which has already been deformed plastically.

In addition to the elevation, at least one end stop is particularly preferably formed by way of a further pressed-in portion, with the result that a common tool, in particular a ram with a hemispherical end, can be used for both pressed-in portions.

The vehicle seat preferably has an easy-entry function, the elevation being arranged in such a way that at least the frontmost ball, if at least the frontmost ball has passed the elevation, the same, and the vehicle seat is therefore held in the easy-entry position via the ball holder and the second seat rail. A displaceability can be provided here, limited by the elevation and the front end stop. By virtue of the fact that a certain force which has to be applied by the user is required to overcome the elevation, the user can recognize that the vehicle seat is arranged in the correct position.

The vehicle seat is preferred here, in particular, if at least the frontmost ball has passed the elevation, displaceably in a limited region between the front end stop and the elevation, with the result that pulling back of the vehicle seat is simplified.

The elevation is arranged in the rail in such a way that the vehicle seat can be displaced in a region of at most five ball diameters of the balls between the front end stop and the elevation.

In particular, the elevation is arranged in such a way that the vehicle seat can be displaced in a region of at least one, in particular at least two ball diameters of the balls between the front end stop and the elevation.

The elevation is preferably arranged in a rounded corner region of the seat rail.

The elevation is preferably arranged, in particular, in the direction of the bisector between the bottom and the side of the seat rail.

The elevation which can be overcome by at least one ball preferably has a height of at most ¼ of the ball diameter of the ball.

The holder particularly preferably has a bevel and passes easily into contact with the elevation, a slight, purely elastic deformation of the holder taking place when moving over said elevation.

The maximum adjustment region of the ball holder is preferably delimited to the front and to the rear in each case by a stationary end stop, at least one of the end stops, in particular the front end stop, being formed by a larger elevation. Said elevation is also preferably produced by means of being pressed in.

The elevation which forms an end stop preferably has a height of at least ⅓ of the ball diameter of the ball/balls and, in its function as an end stop, comes into contact with the ball holder and, in particular, preferably does not come into contact with the outermost ball.

A vehicle seat of this type can be used, for example, in a passenger motor vehicle or commercial vehicle; it does not necessarily have to be the driver's seat. A vehicle seat of this type is preferably provided in a front seat row, but it can also be provided in a middle or rear seat row, for example also in a van.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective view of a seat rail pair for a longitudinally adjustable vehicle seat in accordance with the first exemplary embodiment;

FIG. 2 is another perspective view of the seat rail pair;

FIG. 3 is a detailed view from FIG. 2;

FIG. 5 is a diagrammatic cross sectional view through the seat rail pair; and

FIG. 6 is a diagrammatic illustration of a vehicle seat with seat rail pairs according to the invention.

DESCRIPTION OF THE PREFERRED EMBODIMENTS

Figure 4:
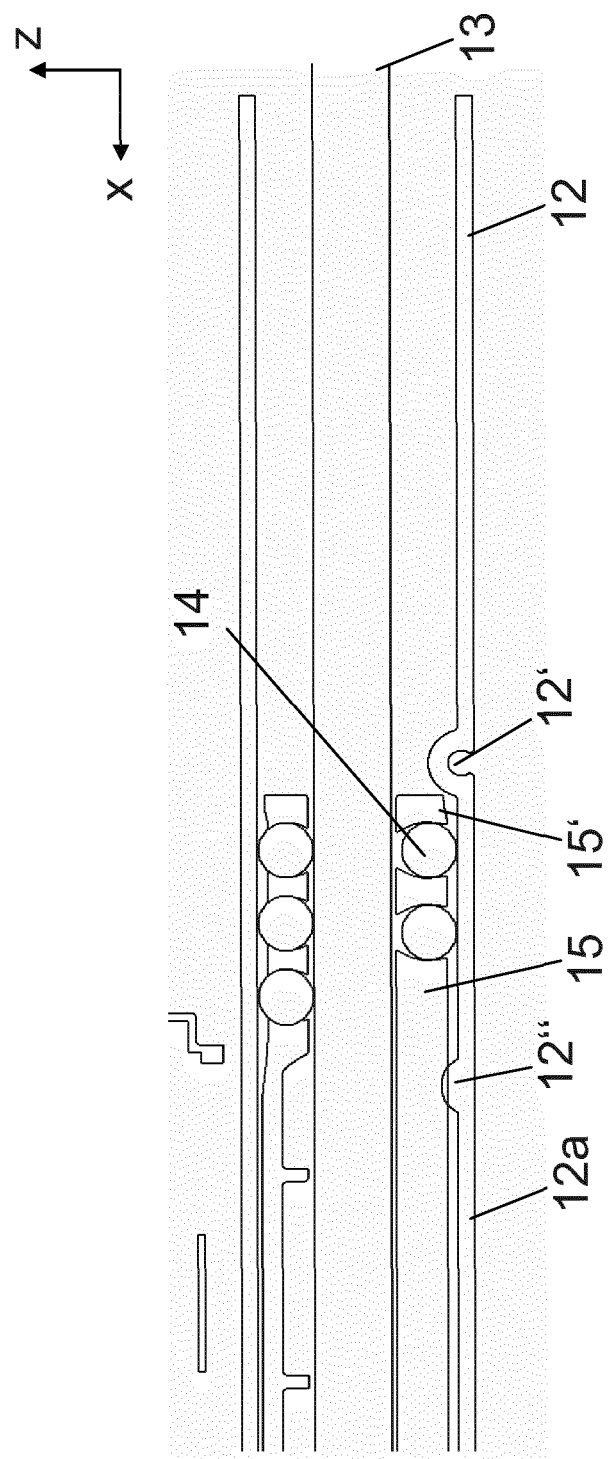
FIG. 4 is a diagrammatic longitudinal sectional view through the seat rail pair.

Referring to the drawings in particular, a longitudinally adjustable vehicle seat 1, for a three-door motor vehicle in the present case, has a seat face 2, a backrest 3 which is connected to the seat face such that its inclination can be adjusted via a fitting in a known way, and a scissor-type frame 4 which is arranged below the seat face 2 for the inclination and height adjustability of the seat face 2, it also being possible as an alternative for the inclination and height adjustability of the seat face 2 to be omitted.

The vehicle seat 1 is connected to the vehicle structure 11 via two seat rail pairs 10, the two seat rail pairs 10 being configured in each case so as to correspond to one another, with the result that only one seat rail pair 10 will be described in greater detail in the following text. The vehicle seat 1 has a longitudinal adjuster having a hoop 5 as operating element for the longitudinal adjuster, it being possible for a locking apparatus 6 which locks the seat rail pair 10 to be unlocked via the hoop 5, with the result that the vehicle seat 1 can be adjusted longitudinally within a comfort adjusting region. Said hoop 5 is provided on the bottom of the vehicle seat 1 in order to operate the locking apparatus 6. The torque which is introduced via the hoop 5 is transmitted at the same time via a transverse rod (not shown in greater detail) to the locking apparatuses 6 which are provided on both seat rail pairs 10.

Furthermore, the vehicle seat 1 has an easy-entry function. In order to facilitate entry, the backrest 3 can be unlocked and can be pivoted forward by means of actuation of a handle 8 which is arranged on the backrest side, the locking apparatus 6 also being unlocked in the present case in a somewhat time-delayed manner with regard to the pivoting forward of the backrest 3, with the result that the vehicle seat 1 can be displaced forward, in the present case beyond the comfort adjusting region. Here, triggered by an actuation of the handle 8 and the associated pivoting forward of the backrest 3, a Bowden cable (not shown in greater detail) is actuated which unlocks the fittings of the vehicle seat 1. As a result of the pivoting movement of the backrest 3, two further Bowden cables are actuated which are provided on both seat sides. On account of the mirror-symmetrical design, only one seat side will be described in greater detail in the following text. The Bowden cable which has an excess travel protection means which is configured in a known way is connected to the locking apparatus 6 which is released when the backrest 3 is pivoted forward.

Furthermore, an actuation of a disconnectable end stop can in principle take place via the Bowden cable, as described in DE 10 2008 056 969 B3. According to the present exemplary embodiment, however, no disconnectable end stop is provided.

In the present case, the seat rail pairs 10 are configured so as to correspond to one another, with the result that only one of the seat rail pairs 10 will be described in the following text. The seat rail pair 10 has a first seat rail 12 which is arranged at the bottom and is connected fixedly to the vehicle structure 11, in the present case with two adapters positioned in between, and a second seat rail 13 which is connected to the seat substructure, that is to say the scissor-type frame 4 in the present case. Here, the first seat rail 12 is configured with a bottom 12a which bears against the vehicle structure 11 and in which apertures for attachment are provided, and two upwardly bent sides 12b which have edge regions 12c which are bent inwardly by 180°. The second seat rail 13 is arranged inside the first seat rail 12, said second seat rail 13 having a flat region 13a which is arranged at the top for connection to the scissor-type frame 4, two downwardly bent sides 13b and edge regions 13c which are bent to the outside and are arranged between the sides 12b and the edge regions 12c of the first seat rail 12, with the result that the first seat rail 12 reaches around the second seat rail 13. In order to keep the friction between the two seat rails 12 and 13 low, a plurality of balls 14 are arranged above and below on both sides of the outwardly bent edge regions, that is to say in each case in the lateral region of the seat rail intermediate space, with the insertion of ball cages or holders 15. In the present case, two balls 14 are provided at the front at the bottom and three balls 14 are provided at the rear at the bottom. Three balls 14 with a somewhat smaller diameter are provided at the front at the top, whereas only two balls 14 with a somewhat smaller diameter are provided at the rear at the top. The number of balls 14 can be varied, however, the use of two balls 14 at the front at the bottom being preferred according to the present exemplary embodiment.

The second seat rail 13 can be displaced within an adjusting region for normal use of the vehicle seat 1 between end positions which are defined by end stops, and can be locked releasably at various seat longitudinal positions of the vehicle seat 1 with the aid of said locking apparatus 6, as is shown in principle in DE 10 2008 056 683 A1, or as an alternative, for example, a locking apparatus as shown in EP 1 389 557 B1. End stops are provided for limiting the adjusting region. The front end stop 12' is formed by a pressed-in portion, called an end stop elevation in the following text, which, on the seat rail inner side of the first seat rail 12, forms an elevation which protrudes into the ball raceway of the lower balls 14 which run in the rounded corner region, to such an extent that the front end of the ball holder 15 of the lower balls 14 comes into contact with it if the second seat rail 13 is situated in its frontmost position (see FIG. 4). The end stop elevation protrudes into the ball raceway approximately at a height of from ⅓ to ½ the ball diameter. The rear end stop can be configured in a corresponding way. As an alternative, the end stops can also be configured in accordance with the end stops which are described in DE 10 2008 056 969 B3.

In each case one smaller arched elevation 12" is provided in the lower ball raceways counter to the driving direction, arranged somewhat spaced away from the end stop elevation, the smaller elevations 12" in the present case being arranged directly in the rounded corner regions between the bottom 12a and sides 12b of the first seat rail 12 and being oriented at a 45° angle with respect to the ball raceway. In the present case, the height of the smaller elevation 12" is approximately ⅕ of the ball diameter. As a rule, the height of the smaller elevation 12" is at most ¼ of the ball diameter, in order to be able to ensure that the ball holder 15 including ball/balls 14 can be moved over the smaller elevation 12".

The elevation 12" is produced by means of a ram which, in the present case, has an approximately hemispherical head and is pressed from the outside onto the seat rail 12 with a great force, with the result that a plastic deformation of the seat rail 12 takes place and the inner wall is also pressed inward in the rounded corner region, which results in an arched elevation which protrudes into the ball raceway, that is to say interrupts the straight running face with an arch.

The function of the longitudinal adjuster is as follows: if the backrest 3 is unlocked and pivoted forward by means of the handle 8 in order to facilitate entry into a rear row, the locking apparatus 6 is also unlocked (in a somewhat time-delayed manner in the present case with regard to the pivoting forward of the backrest 3), with the result that the vehicle seat 1 can be displaced forward. When the frontmost of the balls 14 reaches the smaller elevation 12", a slight resistance has to be overcome, in order for it to be possible to push the vehicle seat 1 further forward. This applies correspondingly when the second ball 14 subsequently reaches the smaller elevation 12". In the present case, the spacing of the smaller elevation 12" from the end stop elevation is somewhat greater than the spacing of the two balls 14, with the result that a slight play is provided for the vehicle seat 1 in the frontmost position, as a result of which pushing to the rear is facilitated.

In the case of a suitably elastic configuration of the ball holder 15, a certain contact of the ball holder 15 with the smaller elevation 12" with elastic deformation of said ball holder 15 can also be provided, without impeding the function of the smaller elevation 12". In the present case, the ball holder 15 has a bevel 15' at the front end, in order to pass more easily over the smaller elevation 12", said ball holder 15 bearing directly against the front end stop 12', however, without the frontmost ball 14 coming into contact with the end stop 12' (See FIG. 4).

In the present case, only two balls 14 are provided in the ball holder 15 at the front at the bottom, whereas three balls 14 are provided at the top, but the number of balls 14 can be varied; in particular, only one ball or three and optionally more balls can be provided.

According to one variant (not shown in the drawing) of the first exemplary embodiment, the front end stop and the smaller elevation are arranged considerably closer to one another, namely in such a way that only the first ball passes over the smaller elevation before the ball holder comes into contact with the front end stop and stops the forward movement of the vehicle seat. This refinement also makes a defined end position of the vehicle seat possible for the easy-entry position.

According to a second exemplary embodiment which is not shown in the drawing, a smaller elevation is provided on the rear end region of the adjusting region and serves to ensure that the user can recognize that the vehicle seat is situated in a rear position, for example in a position, in which a child seat or an infant carrier can be attached to the seat. In this case, the smaller elevation interacts with the rear balls of the rear ball holder. The design of the smaller elevation corresponds to that described above.

It is also possible to provide a plurality of smaller elevations which indicate intermediate positions to the user in a manner which is distributed over the adjusting region of the vehicle seat equidistantly or in any other desired way.

According to a further exemplary embodiment which is not shown in the drawing, the seat rail pairs are arranged rotated by 90° about the longitudinal axis with respect to the arrangement of the first exemplary embodiment, that is to say the first seat rail is attached, for example, to a vertically running wall of the vehicle structure, whereas the second seat rail is attached from the inside (or optionally also from the outside) to the scissor-type frame (or optionally also another seat substructure). In this lateral arrangement, the smaller elevations are preferably formed on the two rounded corner regions of the lower side of the first seat rail.

While specific embodiments of the invention have been shown and described in detail to illustrate the application of the principles of the invention, it will be understood that the invention may be embodied otherwise without departing from such principles.

The invention claimed is:
1. A longitudinally adjustable vehicle seat comprising:
a seat rail pair, having a first seat rail which is fixed to a vehicle structure, and a second seat rail which is guided in said first seat rail and is connected to the vehicle seat;
a ball holder;
balls arranged in the ball holder and are arranged between the first seat rail and the second seat rail, in order to reduce friction, the first seat rail forming a ball raceway, along which the balls roll;
a first end stop and a second end stop which delimit a movability of the seat rail pair; and an elevation which protrudes into the ball raceway, wherein the elevation may be overcome by at least one ball and the ball holder.

2. The vehicle seat as claimed in claim 1, wherein the elevation is formed by a plastic deformation of the first seat rail based on a portion being pressed-in from an outside.

3. The vehicle seat as claimed in claim 1, wherein the vehicle seat has an easy-entry function, and the elevation is arranged such that at least a frontmost ball can pass the elevation, as a result of which the vehicle seat is held in a easy-entry position.

4. The vehicle seat as claimed in claim 3, wherein, if at least the frontmost ball has passed the elevation, the vehicle seat can be displaced in a limited region between a front end stop and the elevation.

5. The vehicle seat as claimed in claim 1, wherein the elevation is arranged in a rounded corner region of the first seat rail.

6. The vehicle seat as claimed in claim 1, wherein the elevation is arranged in a direction of the bisector between a bottom and a side of the first seat rail.

7. The vehicle seat as claimed in claim 1, wherein the elevation has a height of at most ¼ of a ball diameter of the at least one ball.

8. The vehicle seat as claimed in claim 1, wherein at least one of the first end stop and the second end stop comprises at least one elevation, said elevation having a height of at least ⅓ of a ball diameter of the ball/balls and functions as an end stop by coming into contact with the ball holder.

9. The vehicle seat as claimed in claim 1, wherein the vehicle seat has an easy-entry function, and the elevation is arranged in such a way that the vehicle seat can be displaced in a region of at most five ball diameters of the balls between the front end stop and the elevation.

10. The vehicle seat as claimed in claim 1, wherein the ball holder has a bevel and passes into contact with the elevation, an elastic deformation of the ball holder taking place when moving over said elevation.

* * * * *